United States Patent
Hain et al.

(10) Patent No.: US 6,285,157 B1
(45) Date of Patent: Sep. 4, 2001

(54) FAN COOLER

(75) Inventors: Markus Hain, Dillenburg; Jörg Kreiling, Biebertal, both of (DE)

(73) Assignee: Rittal-Werk Rudolf Loh GmbH & Co. KG, Herborn (DE)

( * ) Notice: Subject to any disclaimer, the term of this patent is extended or adjusted under 35 U.S.C. 154(b) by 0 days.

(21) Appl. No.: 09/402,841

(22) PCT Filed: Apr. 1, 1998

(86) PCT No.: PCT/EP98/01876

§ 371 Date: Oct. 12, 1999

§ 102(e) Date: Oct. 12, 1999

(87) PCT Pub. No.: WO98/45934

PCT Pub. Date: Oct. 15, 1998

(30) Foreign Application Priority Data

Apr. 10, 1997 (DE) ............................................. 197 14 856

(51) Int. Cl.[7] ........................................................ H02P 5/28
(52) U.S. Cl. ........................... 318/809; 318/268; 318/272; 165/104.33
(58) Field of Search .................................... 318/809, 268, 318/272, 254; 165/104.33

(56) References Cited

U.S. PATENT DOCUMENTS 6,041,851 * 3/2000 Diebel et al. ..................... 165/104.33

FOREIGN PATENT DOCUMENTS 43 09 187    6/1994 (DE) .
2296608  *  7/1996 (GB) .

OTHER PUBLICATIONS

Zündtransformator oder Optokoppler? Schutz vor Fehlzündung bei Thyristor und Triac, *elekronikpraxis*, Nr., 3, 146, Mar. 1981.

Alex Toth: Leistungsfaktor durch Einchipcomputer gesteuert, *Elektronik*, 97–101, Dec. 1981.

* cited by examiner

*Primary Examiner*—Paul Ip
*Assistant Examiner*—Rita Leykin
(74) *Attorney, Agent, or Firm*—Pauley Petersen Kinne & Fejer

(57) ABSTRACT

A fan cooler for electric or electronic sub-assemblies having a control circuit with a control stage for controlling the speed of rotation of a fan motor connected to the control stage depending on set values. To achieve a polyvalent operation with a simple design, the fan motor is a phase-controlled asynchronous motor, the control circuit has a microcontroller that controls the control stage, an optic coupler is connected between the control stage and the microcontroller, and the microcontroller determines the operating angle for controlling the fan motor on the basis of the set values and the zero crossing of a control signal.

8 Claims, 1 Drawing Sheet

FAN COOLER

BACKGROUND OF THE INVENTION

1. Field of the Invention

This invention relates to a fan cooling device for electrical or electronic components, having a control circuit with a control stage and is designed to control a number of revolutions of a fan motor connected to the control stage as a function of preset values.

2. Description of Prior Art

A fan cooling device of this type is known from German Patent Reference DE 40 24 046 A1. This known fan cooling device has a collectorless d.c. motor as the fan motor, which is driven in a manner wherein the number of revolutions is controlled as a function of an air temperature, wherein a minimum number of revolutions is associated with a lower fixed threshold temperature, and a maximum number of revolutions is associated with an upper fixed threshold temperature. The control circuit here is relatively elaborate.

SUMMARY OF THE INVENTION

One object of this invention is to provide a fan cooling device of the type mentioned at the outset, which permits manifold control options along with a simple design.

This object is attained by means of the characteristics described in this specification and set forth in the claims. A fan motor is an asynchronous motor, which is controlled by phase control. The control circuit includes a microcontroller connected upstream of a control stage. An optocoupler is switched between the control stage and the microcontroller and the microcontroller determines a phase control angle for control of the fan motor as a function of the detection of the crossover of the cullent of a control signal and of the preset values.

A simple control is possible using the asynchronous motor as the fan motor, wherein the provided power can be simply varied with a phase control which is known per se. It is easy to preset a desired control and to match the control to different conditions simply by connecting a microcontroller upstream of an actual control stage of the fan motor. In this case the microcontroller is only under a minimal load, since an optocoupler is arranged between the microcontroller and the control stage, which in addition results in a galvanic separation. The control data can be made available by the microcontroller without elaborate switching measures.

A simple change in the control can be achieved with preset values that include a minimum setting of the number of revolutions, a command value and an actual value. A minimum setting of the number of revolutions can be regulated by a unit for setting the minimum number of revolutions and the command value can be regulated by a command value presetting unit.

Furthermore, for connecting the microcontroller and for signal transmission, a further optocoupler is arranged between a crossover detection circuit and the microcontroller.

A further advantageous aspect of this invention is that the optocoupler is embodied as an opto-triac. As a result, the optocoupler can assume different switching functions.

If the fan is arranged in a switchgear cabinet, the microcontroller is connected to a higher-order switchgear cabinet control and a selection can be made by the switchgear cabinet control or manually. Thus, the microcontroller controls the fan motor either alone on the basis of preset values entered directly into the microcontroller, or on the basis of preset values supplied through the switchgear cabinet control. The fan cooling device for controlling the fan motor can be operated either autonomously or as a function from a higher-order control unit. In this case the fan cooling device can be a part of a total cooling arrangement, which comprises a combination of several control circuits with associated fans, or a combination of at least one control circuit with an associated fan and other cooling apparatus. The cooling devices can be controlled in accordance with a preset program by the switchgear cabinet control. For example, if a fan cooling device breaks down, its breakdown can be compensated by other components of the total cooling arrangement. Also, a fan cooling device can be turned off, for example, if it operates incorrectly or if reduced noise generation is desired. These modes of operation can be selected by means of simple programming of the switchgear cabinet control.

BRIEF DESCRIPTION OF THE DRAWINGS

This invention will be explained in greater detail in what follows, making reference to the drawing FIGURE which schematically represents a circuit diagram of a fan cooling device.

DESCRIPTION OF PREFERRED EMBODIMENTS

Figure 1:
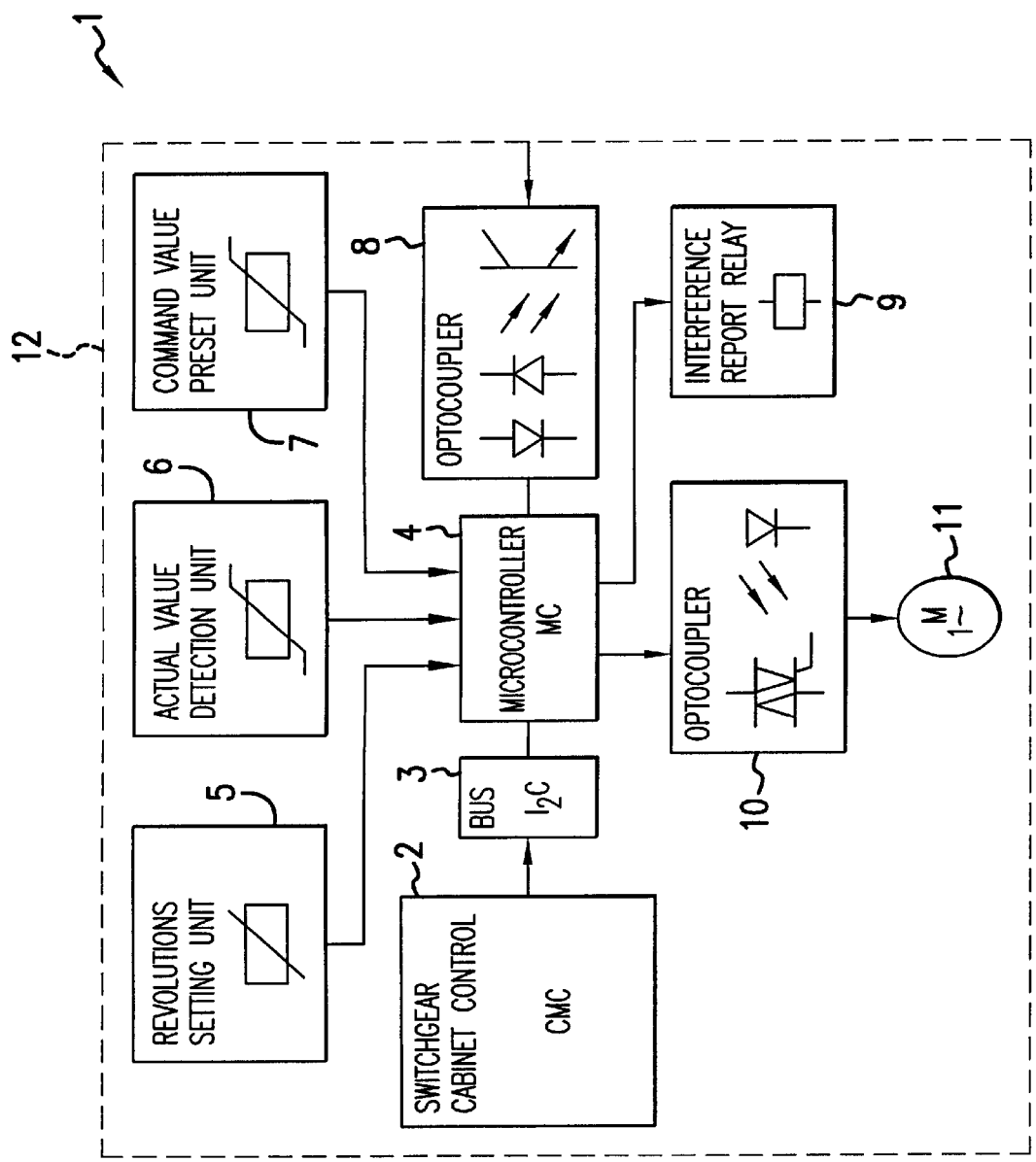

A fan cooling device arranged in a switchgear cabinet 12 has a control circuit 1 for a fan motor 11. The control circuit 1 is connected by means of an $I^2C$-bus to a higher-order switchgear cabinet control 2. The control circuit 1 contains a microcontroller 4 as the central control component, which on the basis of preset values controls a control stage, not shown in detail in the drawing, via an optocoupler 10 in the form of an opto-triac which controls the fan motor 11. The microcontroller 4 receives signals regarding a crossover detection of the control signals for the fan motor with a further optocoupler 8. A minimum number of revolutions, as well as a command value for the temperature, can be set by means of a minimum number of revolutions setting unit 5 and a command value preset unit 7. An actual value detection unit 6 for determining an existing temperature is provided for control of the number of revolutions.

The control stage of the fan motor operates in accordance with the phase control method, wherein the microcontroller 4 issues a signal for the phase control angle depending on the required output of the fan motor 11. The microcontroller 4 is protected against the appearance of excess voltages by means of the optocoupler 10 and the optocoupler 8, and is also only put under a low load. In case of the appearance of an error, such as a sensor monitoring, a fan monitoring or an excess temperature monitoring, the microcontroller 4 can issue an interference report signal, which controls an interference report relay 9 for signaling the interference state.

The microcontroller 4 can either perform control of the fan motor 11 alone with preset values, which include the minimum number of revolutions, the actual value of the temperature and its command value, or it can be reversed by means of the switchgear cabinet control 2, so that the microcontroller 4 performs the control on the basis of data supplied by the switchgear cabinet control 2. Thus the fan cooling device can be operated as a part of a total control, for example in combination with other fan cooling devices or in combination with other cooling devices. In case of the appearance of an error, the fan cooling device can be switched off and its function can be taken over by another cooling device or the cooperation of other cooling devices.

Multitudinous modes of operation can be realized by this linkage with the switchgear cabinet control by means of simple programming, which can also be fixed as a function of the time of day or as a function of the conditions of the surroundings.

What is claimed is:

1. In a cooling system arranged in a switchgear cabinet (12), a fan cooling device for electric components, having a control circuit which has a control stage designed to control a number of revolutions of a fan motor in a form of an asynchronous motor connected to the control stage as a function of preset values, wherein the fan motor (11) is controlled by phase control, the control circuit (1) includes a microcontroller (4) connected upline of the control stage, an optocoupler (10) is switched between the control stage and the microcontroller (4), and the microcontroller (4) determines a phase control angle for control of the fan motor (11) on a basis of a detection of a crossover of current of a control signal and of the preset values and is connected to a further control device, the improvement comprising a switchgear cabinet control (2) connected via a data bus to the microcontroller, and means for determining one of the switchgear cabinet control (2) or manual control, such that the microcontroller (4) controls the fan of: a) alone on a first basis of the preset values set manually by means of the revolutions setting unit (5) and the command value preset unit (7) and entered from the revolutions setting unit (5) and the command preset unit (7) directly into the microcontroller (4) and b) on a second basis of the preset values supplied through the switchgear cabinet control (2).

2. In the fan cooling device in accordance with claim 1, wherein the preset values include a minimum setting of the number of revolutions, a command value and an actual value, and the minimum setting of the number of revolutions is set as a function of a minimum number of revolutions setting unit (5) and a command value by a command value presetting unit (7).

3. In the fan cooling device in accordance with claim 2, wherein a second optocoupler (8) is arranged between a crossover detection circuit and the microcontroller (4).

4. In the fan cooling device in accordance with claim 3, the optocoupler (10) is embodied as an opto-triac.

5. In the fan cooling device in accordance with claim 4, wherein the fan cooling device, is a part of a total cooling arrangement which comprises one of a plurality of control circuits (1) with associated fans and at least one control circuit with an associated fan and an other cooling apparatus, and the cooling device can be controlled in accordance with a preset program by the switchgear cabinet control (2).

6. In the fan cooling device in accordance with claim 1, wherein a second optocoupler (8) is arranged between a crossover detection circuit and the microcontroller (4).

7. In the fan cooling device in accordance with claim 1, wherein the optocoupler (10) is embodied as an opto-triac.

8. In the fan cooling device in accordance with claim 1, wherein the fan cooling device is a part of a total cooling arrangement which comprises one of a plurality of control circuits (1) with associated fans and at least one control circuit with an associated fan and an other cooling apparatus, and the cooling device can be controlled in accordance with a preset program by the switchgear cabinet control (2).

* * * * *